United States Patent
Brady, Jr.

(10) Patent No.: US 10,604,327 B2
(45) Date of Patent: Mar. 31, 2020

(54) REMOVABLE INSULATOR FOR A FLUID CONTAINER

(71) Applicant: Robert William Brady, Jr., Blaine, TN (US)

(72) Inventor: Robert William Brady, Jr., Blaine, TN (US)

(73) Assignee: Robert W Brady Jr., Blaine, TN (US)

( * ) Notice: Subject to any disclaimer, the term of this patent is extended or adjusted under 35 U.S.C. 154(b) by 214 days.

(21) Appl. No.: 15/916,430

(22) Filed: Mar. 9, 2018

(65) Prior Publication Data
US 2019/0276220 A1 Sep. 12, 2019

(51) Int. Cl.
| | | |
|---|---|---|
| *B65D 81/38* | (2006.01) | |
| *B65D 25/34* | (2006.01) | |
| *A01K 7/02* | (2006.01) | |
| *F24H 1/00* | (2006.01) | |

(52) U.S. Cl.
CPC .......... *B65D 81/3876* (2013.01); *A01K 7/027* (2013.01); *B65D 25/34* (2013.01); *F24H 1/00* (2013.01); *B65D 2313/02* (2013.01)

(58) Field of Classification Search
CPC ................ B65D 81/3876; B65D 25/34; B65D 2313/02; A01K 7/027
USPC .......................... 219/204, 432, 438, 523, 529
See application file for complete search history.

(56) References Cited

U.S. PATENT DOCUMENTS

| | | | | |
|---|---|---|---|---|
| 2003/0019654 A1* | 1/2003 | Merritt | ................ | H02G 3/0431 174/72 A |
| 2004/0139860 A1* | 7/2004 | Hamm | ................ | A47J 36/2433 99/275 |
| 2019/0168946 A1* | 6/2019 | Walsh | ................ | A47J 36/2433 |

* cited by examiner

*Primary Examiner* — Thien S Tran

(57) ABSTRACT

A removably attachable insulator having a jacket adapted to slide over a container for keeping the contents of the container at or near a predetermined temperature is provided. The jacket may include heating elements attached thereto for heating the container. A control circuitry is also integrated with the jacket, the control circuitry providing a thermostat adapted to set and control the temperature through operatively associating with the heating elements. The jacket and container may become removably attached through the use of detachable fasteners integrated with the container and or the jacket.

1 Claim, 4 Drawing Sheets

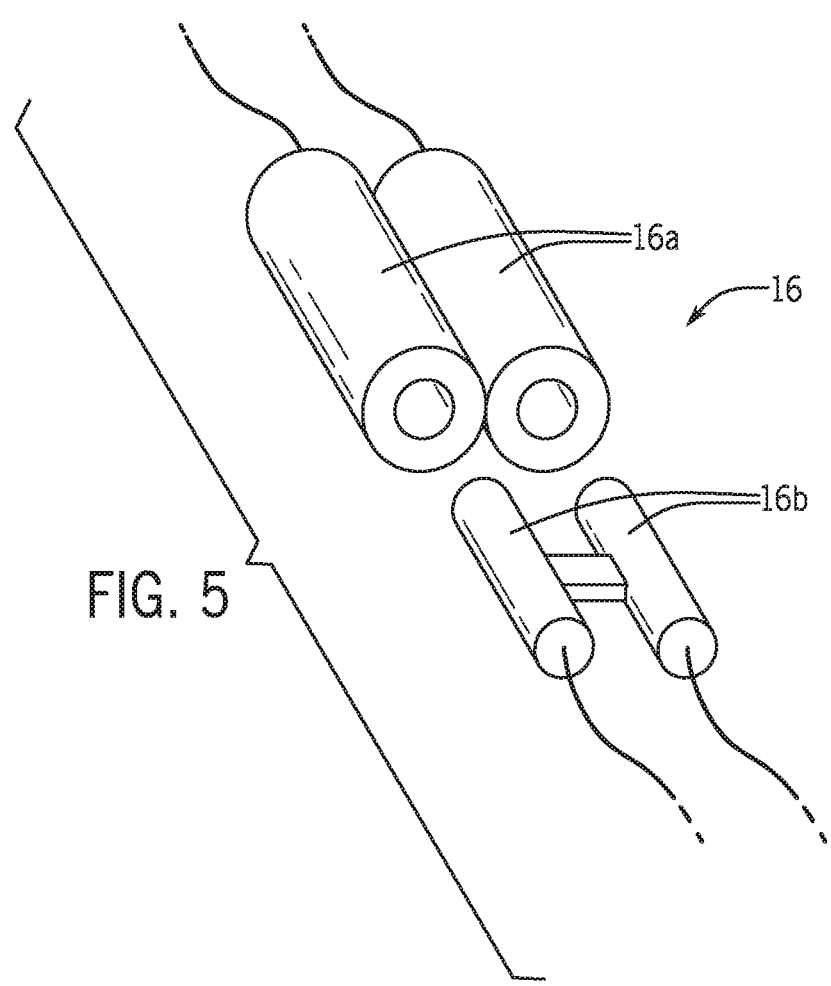

US 10,604,327 B2

REMOVABLE INSULATOR FOR A FLUID CONTAINER

BACKGROUND OF THE INVENTION

The present invention relates to container insulators and, more particularly, to a removable insulator for a water bucket.

Horses tend to play with their water buckets. They will chew at the handle/cord, pull the bucket from the wall or rub on it, breaking or cracking the bucket.

Solutions to keep horses' water buckets water from freezing by employing a specially-designed bucket. These specialized buckets can break due to the abovementioned horseplay, requiring the horse owner to repeatedly invest in a relatively expensive product. Moreover, such specialized water buckets have a tendency to shock the horse as they utilize power cords. Also, the current solutions tend to over-heat the water.

As can be seen, there is a need for a removable insulator for a water bucket so that the insulator of the present invention can be attached to an existing, inexpensive water bucket to prevent the water from freezing in the cold. Furthermore, the removable insulator could be adjustable to any container, such as pipes, troughs, and the like, for controlling the temperature of its contents. Because of its flexible nature, the insulator of the present invention can withstand more abuse by the horse than the above-mentioned specialized products. Moreover, the insulator of the present invention has no cord for the horse to chew on since it is DC powered, meaning that it can run on a battery without a cord as it does not require an AC power/outlet connection. Furthermore, the present invention can be run from an existing, DC-powered distributed energy generation solution such as a solar cell.

SUMMARY OF THE INVENTION

In one aspect of the present invention, a removable insulator for heating a container includes a jacket made of bite-resistant material having thermal insulating and waterproof properties, wherein the jacket is tubular as it extends from an open first end to a second end; a plurality of heating elements attached to the jacket; a power source attached to the jacket; and a control circuitry configured to set and control power from the power source delivered to the heating elements.

In another aspect of the present invention, the removable insulator for heating a container includes a jacket made of jacket material having thermal insulating, water-proof, and bite-resistant properties, wherein the jacket is tubular as it extends from an open first end to a second end, wherein the jacket tapers inward as it extends to the second end; a plurality of heating elements attached to the jacket; a power source attached to the jacket; a control circuitry providing one or more thermal sensors and a thermostat configured to set and control power from the power source delivered to the heating elements; an electrical quick connection interconnecting the power source and the control circuitry; a plurality of first removable fasteners attached along an inward-facing periphery of the jacket and adjacent to the first opening; and a plurality of second removable fasteners attached along an outward-facing periphery of the container so as to align with the plurality of first removable fasteners respectively, wherein the first and second removable fasteners cooperatively engage.

These and other features, aspects and advantages of the present invention will become better understood with reference to the following drawings, description and claims.

BRIEF DESCRIPTION OF THE DRAWINGS

FIG. 5 is an exploded detail perspective side view of an exemplary embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a removably attachable insulator having a jacket adapted to slide over a container for keeping the contents of the container at or near a predetermined temperature. The jacket may include heating elements attached thereto for heating the container. A control circuitry is also integrated with the jacket, the control circuitry providing a thermostat adapted to set and control the temperature through operatively associating with the heating elements. The jacket and container may become removably attached through the use of detachable fasteners integrated with the container and or the jacket.

Figure 1:
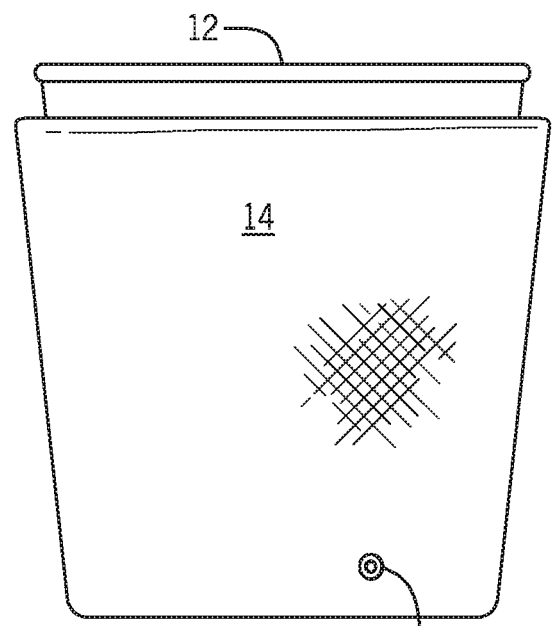
FIG. 1 is a side elevational view of an exemplary embodiment of the present invention.
Figure 2A:
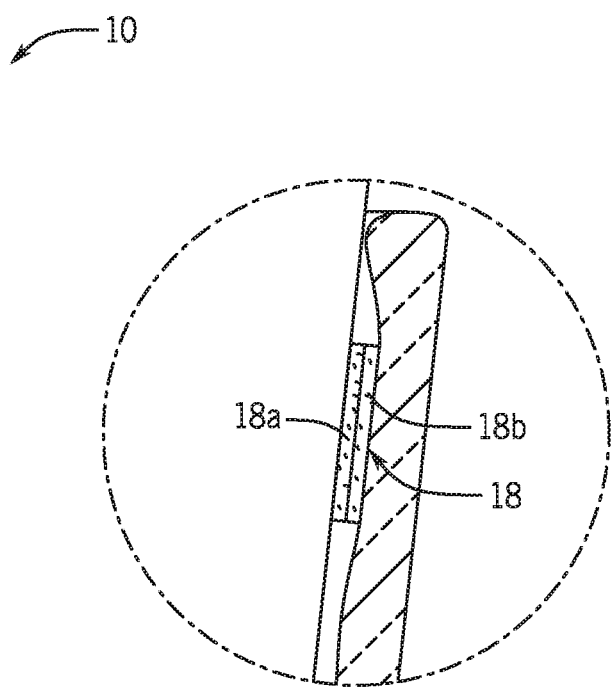
FIG. 2A is an enlarged detail view of an exemplary embodiment of the present invention, taken along line 2A-2A of FIG. 2.
Figure 2:
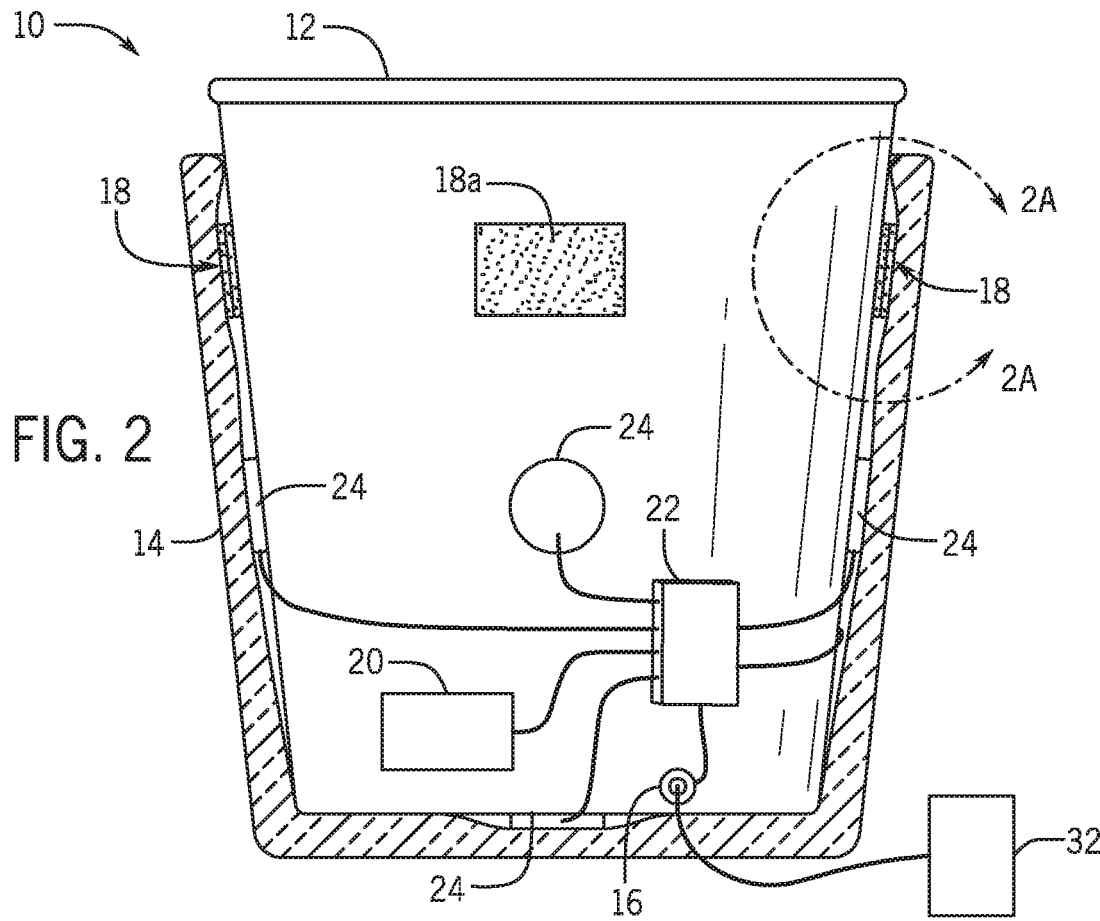
FIG. 2 is a side elevational view of an exemplary embodiment of the present invention, with portions of the insulator shown in cross-section.
Figure 3:
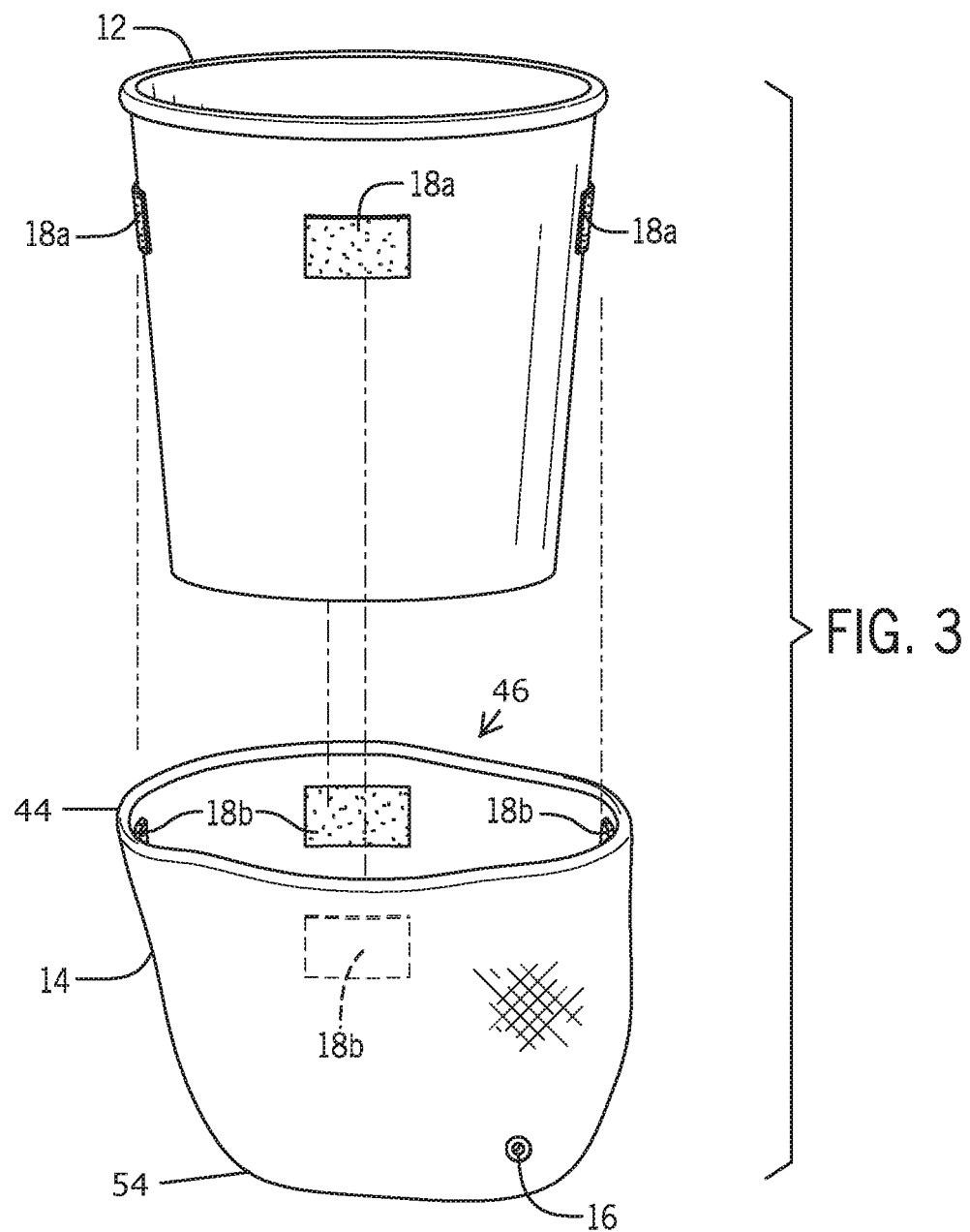
FIG. 3 is an exploded perspective view of an exemplary embodiment of the present invention.

Referring to FIGS. 1 through 5, the present invention may include a removable insulator 10 for a container 12 adapted to retain a fluid. The insulator 10 may provide a jacket 14 made of temperature insulating material that is also water proof and bite-resistant. The jacket 14 may be generally tubular as it extends from a first end 44 to a second end 54, wherein some embodiments the jacket 14 taper inward as it extends to the second end 54, so that a first diameter defined by the first end 44 is diametrically larger than a second diameter defined by the second end 54. The first end 44 may define a first opening 46 for slidably receiving the container 12, as illustrated in FIG. 3. The second end 54 may or may not be closed—i.e., the removable insulator 10 could be wrap with no closed ends.

The jacket 14 may be layered so as to embed or house a plurality a heating element 24 therein. In certain embodiments, the heating elements may be equidistantly spaced apart along a circumference of the jacket 14, such as at 120 degrees. Heating elements 24 may also be disposed along the second end 54 as well.

Figure 4:
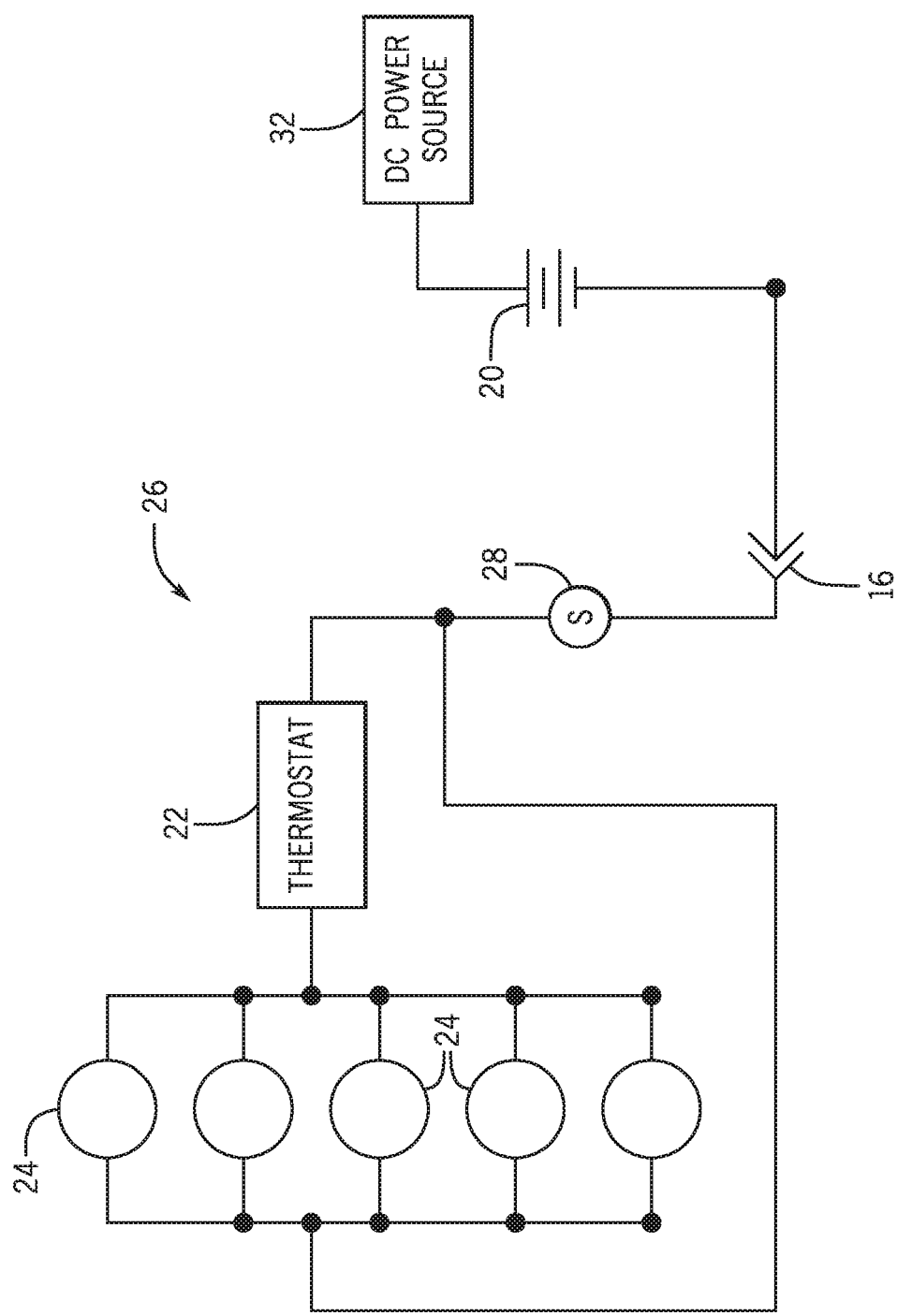
FIG. 4 is a schematic electrical view of an exemplary embodiment of the present invention.

Also embedded in or attached to the jacket 14 may be a control circuitry 26 interconnecting the heating elements 24 and a power source, as illustrated in FIG. 4. The control circuitry 26 may include an electrical quick connection 16 having a socket 16a and plug 16b, as illustrated in FIG. 5, for electrically connecting to said power source by coupling the plug 16*b* to the socket 16*a*. The remaining elements of the control circuitry 26 may include a thermostat 22 operatively associated to the temperature sensor 28 and the heating elements 24. The thermostat 22 may be adapted so that if the temperature sensor 28 determines a system or insulator temperature that exceeds a predetermined threshold temperature (set through the thermostat 22), the electrical quick connection 16 is electrically disconnected until the insulator temperature is equal or less than the predetermined threshold temperature. The thermostat 22 may be adapted so that the heating elements 24 are cycled on and off to maintain the predetermined threshold temperature for the fluid in the container 12. In other words, if the temperature in the container 12 is below the predetermined threshold temperature, the thermostat 22 turns on the heating elements 24, and if it is above the (or another) predetermined threshold temperature, the thermostat 22 turns the heating elements 24 off. This keeps the heating elements 24 from damaging the container 12 and over-heating the fluid. It also minimizes the amount of energy used by the heating elements 24, maximizing battery life. The power source may include a battery 20 and or DC power source 32, but may also be a form of distributed energy generation source. The power source may be attached to the jacket 14 much like the heating elements 24.

Referring to FIGS. 2 and 2A, the present invention may include a plurality of hook and loop fasteners 18, each having a hook portion 18*a* and a cooperating loop portion 18*b*. The loop portions 18*b* may be adhered to and spaced apart along the outward-facing periphery of the container 12, typically adjacent the rim of the container 12. Cooperatively, the hook portions 18*a* may be adhered to and spaced apart along the inward-facing periphery of the jacket 14, typically adjacent the first opening 46. Thereby, when the container 12 is slid through the first opening 46, the hook and loop portions 18*a* and 18*b* will mate, securing the container 12 within the jacket 14.

A method of using the present invention may include the following. The removable insulator 10 disclosed above may be provided. A user may slide the container 12 through the first opening 46 until the cooperating hook and loop portions 18*a* and 18*b* mate. Then the user may connect the power source to the electrical quick connection 16 after setting the predetermined threshold temperature(s) by setting the thermostat 22. The user may then fill the container 12 with the fluid, most likely water in the context of animal husbandry, and then not have to worry about the animal's water freezing due to cold temperature as the insulator keeps the temperature of the container 12 over 32 degrees Fahrenheit.

It should be understood, of course, that the foregoing relates to exemplary embodiments of the invention and that modifications may be made without departing from the spirit and scope of the invention as set forth in the following claims.

What is claimed is:

1. A removable insulator for heating a container, comprising:
   a jacket made of jacket material having thermal insulating, water-proof, and bite-resistant properties, wherein the jacket is tubular and tapers inward as it extends from an open first end to a second end;
   a plurality of heating elements attached to the jacket;
   a power source attached to the jacket;
   a control circuitry providing one or more thermal sensors and a thermostat configured to set and control power from the power source delivered to the heating elements;
   an electrical quick connection interconnecting the power source and the control circuitry;
   a plurality of first removable fasteners attached along an inward-facing periphery of the jacket and adjacent to the first opening;
   and a plurality of second removable fasteners attached along an outward-facing periphery of the container so as to align with the plurality of first removable fasteners respectively, wherein the first and second removable fasteners cooperatively engage; each first and second removable fastener being a hook and loop fastener, respectively.

* * * * *